United States Patent [19]
Middleton

[11] Patent Number: 5,496,085
[45] Date of Patent: Mar. 5, 1996

[54] AUXILIARY HANDLE UNIT FOR LONG HANDLED HAND TOOLS

[76] Inventor: David J. Middleton, 20 Quarry Crossing, Hudson Falls, N.Y. 12839

[21] Appl. No.: 372,448

[22] Filed: Jan. 13, 1995

[51] Int. Cl.⁶ .................. A01B 1/22; B25G 3/38
[52] U.S. Cl. ............................ 294/58; 16/114 R
[58] Field of Search ............. 294/54.5, 57, 58, 294/59; 16/114 R, 115; 15/145; 37/265, 285

[56] References Cited

U.S. PATENT DOCUMENTS

| | | | |
|---|---|---|---|
| 1,151,012 | 8/1915 | Herringstad | 294/58 |
| 1,456,879 | 5/1923 | Newman | 294/58 |
| 4,615,553 | 10/1986 | Hultine | 294/58 |
| 4,794,667 | 1/1989 | Nelson et al. | 294/58 |
| 5,065,475 | 11/1991 | Watt | 294/58 |
| 5,137,317 | 8/1992 | Bieniek | 294/58 |

FOREIGN PATENT DOCUMENTS

| | | | |
|---|---|---|---|
| 948860 | 8/1949 | France | 294/58 |
| 2266438 | 11/1993 | United Kingdom | 294/58 |

Primary Examiner—Dean Kramer

[57] ABSTRACT

This invention involves an auxiliary handle unit with a grip attached to one end and a securing mechanism means at the other; wherein, the improvements comprise an adjustable, extensible shaft unit with an axially adjustable gripping mechanism secured to one end and an angled connecting bar secured to the opposite end; wherein, the angled connecting bar is pivotally connected to the retrofitable securing mechanism; wherein, the aforementioned invention is secured to the existing long handled implements for transversely using the long handled implements engaging head, and, can be utilized as the no-lift shovel, and, eliminates the operator having to bend over to break away a portion of material onto the shovel engaging head.

1 Claim, 6 Drawing Sheets

AUXILIARY HANDLE UNIT FOR LONG HANDLED HAND TOOLS

TECHNICAL FIELD

The present invention relates generally to an auxiliary handle unit for long handled hand implements.

BACKGROUND OF THE INVENTION

1. Field of the Invention

This invention relates to long handled utility tools such as shovels, mops, paint rollers, rakes, hoes, and the like, and more particularly to rakes, shovels, hoes, and other long handled type tools which have a modified two handle structure to enable the user to rake, shovel, or hoe without exerting undue strain on the user's back and shoulders.

2. Description of the Prior Art

Snow shovels currently on the market are composed of an elongated shaft that is connected to a ground engaging head usually made of metal or plastic. In use the operator pushes the shovel forwards by gripping the main shaft at the top end with one hand and grips the main shaft in the middle with the opposite hand and pushes until a sufficient amount of material has been accumulated on the shovel engaging head. The operator then pivots the main shaft backwards and downwards to break off a portion of snow; then pulls upwardly on the main shaft with their lower-positioned hand and tosses the accumulated material to a desired location. This activity exerts considerable strain on the operators back and shoulders, due largely to the fact that the operator must repeatedly bend over, grip the middle section of the main shaft and stand up straight as the operator pulls upwardly on the shaft to lift and toss the accumulated material from the shovel engaging head; whereas, gripping the main shaft at the mid point increases the leveraged weight of the original material at the shovel engaging head.

Auxiliary grip handles have previously been provided on shovels. For example, modified snow shovels equipped with auxiliary grip handle constructions of one type or another are disclosed in Vaslas, U.S. Pat. No. 4,103,954; Steeb, U.S. Pat. No. 3,082,554; Bickley, U.S. Pat. No. 2,521,441; Batty, U.S. Pat. No. 1,693,472; and Gifford, U.S. Pat. No. 781,772. In addition, the use of auxiliary grip handles and portable shovels is disclosed by McLoughlin in U.S. Pat. Nos. 2,470,217 and 2,520,606. Moreover, auxiliary grip handles have been utilized in snow shovels to facilitate the directional pushing of snow by the shoveler, as described in O'Shera, U.S. Pat. No. 2,826,835. In addition, Waldschmidt, U.S. Pat. No. 4,944,541 teaches the use of an auxiliary grip handle that is pivotally connected to the main shaft of an implement.

Some prior art inventions place grip handles at an intermediate point on the main shaft of the snow shovel. Such grip handles are rigidly attached to the main shaft and do not pivot during the snow shoveling operation (See Gifford, U.S. Pat. No. 781,772 and Batty, U.S. Pat. No. 1,693,472.). Grip handles that are permanently attached to the main shaft of snow shovels are not adjustable along the vertical extension of the main shaft. Moreover, such auxiliary grip handles are not extendible away from the main shaft, thus requiring the operator to bend over to grasp the grip handle and pull the laden shovel upwardly.

Other inventions in the prior art discuss hand grips disposed away from the main shaft, but such hand grips are on a rigidly positioned support that is not capable of pivoting during normal operation. (See Vaslas, U.S. Pat. No. 4,103,954) Furthermore, some inventions in the prior art have auxiliary grip handles fashioned from extended wire cables whose terminal ends are either (1) connected to opposite top ends of a snow shovel scoop (See Steeb, U.S. Pat. No. 3,082,554.) or (2) centrally connected directly to the scoop of the shovel. (See Bickley, U.S. Pat. No. 2,521,441.)

Additionally, Waldschmidt, U.S. Pat. No. 4,944,541 teaches the use of an auxiliary grip handle that is pivotally connected to the main shaft of an implement; wherein, the aforementioned patent is not dimensioned to be retrofitable to existing long handled implements; also, once the main shaft has been fitted with the prior art (see Waldschmidt, U.S. Pat. No. 4,944,541.) the implement cannot be used without the auxiliary handle unit; in addition, the higher up the main shaft the auxiliary handle unit is attached, the heavier the leveraged weight at the shovel engaging head: moreover, prior art auxiliary handle units are not dimensioned to be used transversely with long handled implements nor intended to be used as a no-lift shovel.

SUMMARY OF THE INVENTION

The improved construction that forms the basis of this invention comprises in general an extensible shaft unit that is operatively associated with a retrofitable securing means on one end and a gripping means at the other; whereas, the longitudinal adjustability of the extensible shaft unit is independent of the implements main shaft.

In addition, the improved auxiliary handle unit construction also comprises a retrofitable securing means, which allows the auxiliary handle unit to be used with existing long handled hand tools such as rakes, hoes, shovels, brooms, mops, long handled paint rollers, and the like.

Furthermore; the retrofitable securing means can be adjusted to axially rotate the auxiliary handle unit towards or away from the operator for right or left handed operation, and, different operating needs.

In addition, the retrofitable securing means can be adjusted along the vertical extension of the main shaft to control the main shaft when used as a no-lift shovel, and in the releasing and regripping of the main shaft to break a portion of material off onto the shovel engaging head for disposal.

Additionally, the "D" hand grip is axially adjustable for right or left handed operation, and, different operating needs.

In addition, the improved angled connecting bar, which connects the retrofitable securing means to the extensible shaft member, is angled obliquely exiting from the lower shaft member, which allows the operator to push down on the auxiliary handle unit and obtain a transferred horizontal force to the long handled tools ground/floor engaging head, when the auxiliary handle unit is oblique to the main shaft.

Moreover, the improved design of the applicant's invention allows for a no-lift shovel; whereas, the operator does not have to lift the laden shovel off the ground to move materials from one place to another.

Applicant has studied prior designs of long handled implements in an endeavor to further reduce back and shoulder strain associated with using long handled implements, and, influence the way said long handled implements are used. Auxiliary handle units have been used in prior art, however, no invention in the prior art combines the features embodied within applicant's invention in such a way as to minimize back and shoulder strain and at the same time facilitate a more efficient use of leverage.

The present invention seeks to overcome the problem of back and shoulder strain associated with using long handled implements by providing an extensible shaft unit with a hand grip attached, that is retrofitably and pivotally connected to a main shaft, at the lowest feasible point, of a long handled implement for improved leverage and control of the main shaft, and the implements engaging head. The rigidity of the auxiliary handle unit allows the operator to pull/push the main shaft, at the lowest functional point to the engaging head, which increases the direct pressure applied to the main shafts engaging head. The leverage obtained by the auxiliary handle unit being secured to the lowest point on the main shaft greatly decreases the strain on the operators back and shoulders as opposed to auxiliary handles that are attached to the mid point of the main shaft or are adjustable along the length of the main shaft. The upper shaft member adjusts reciprocally with the lower shaft member, and independent of the main shaft, for different height operators that allows the operator to stand in an upright position. The extensible shaft members being independently adjustable from the main shaft in no way reduce the durability of the main shaft as opposed to prior art that drills apertures through the main shaft for adjustability. The independent adjustability of the applicant's invention is an objective of this invention.

The auxiliary handle units "D" hand grip rotates axially for different gripping positions. Different operators, different long handled implements, different conditions call for different wrist positions of the operator. Some operators may prefer a palm down, or palm up position, which would require a "D" hand grip to be in a horizontal position, whereas, a palm right or left would require a vertical positioned grip, or one of several positions in between. The adjustable "D" hand grip feature is an objective of this invention.

Prior art long handled implements with auxiliary handles attached to the bottom of the main shaft are made to be an integral part of the implement; also, prior art auxiliary handle units are not dimensioned to be used in a transverse way as is the applicants. The best example is seen in prior art snowshovels, rakes, hoes or the like. Prior art examples are not intended to be retrofitable to existing long handled implements as is the applicant's invention and is an objective of this invention.

Prior art modified long handled implements with pivotal auxiliary handles attached to the main shaft, are affixed so the auxiliary handle runs parallel with the main shaft starting at the pivot point. In using the prior art pivotal auxiliary handles on a rake or hoe type tool, a downward and pulling motion cannot be applied simultaneously to the auxiliary handle. If the auxiliary handle is pulled back to quickly, the operators' fingers and knuckles are quickly rapped between the auxiliary handle and the main shaft. The operator applies downward pressure on the rake engaging head via the auxiliary handle unit in one direction, (downwards and forward), while the main shaft is pulled back towards the operator in the raking motion; whereas, the operator is pushing downward and forward with one arm, and, at the same time is pulling in the opposite direction with the other arm. The applicant's invention shows a connecting bar that has several bends. The bends in the connecting bar serve to tightly attach the connecting bar to the lower shaft member and, allows the operator to transversely use the modified long handled implements; whereas, both of the operators arms are working to move the engaging head in the same direction.

It is an objective of the present invention to provide an improved auxiliary handle unit for long handled implements having both an elongated main shaft and an auxiliary handle unit to enable the operator to perform the push, pull, lift, and no-lift task of using long handled implements without having to bend over or unduly strain the operators back and shoulders when performing the task of using a long handled implement.

Another object of the present invention is to provide an auxiliary handle unit with an extensible shaft unit that can be long handled implements engaging head and main shaft without having to bend over and exert undue strain on the users back and shoulders. The present invention utilizes prior art long handled implements having an extended main shaft at the top end and an engaging head (rake, broom, hoe, shovel, mop, paint roller and the like.) securely fastened to the bottom end. The present invention improves those long handled implements by securing an auxiliary handle unit to the main shaft to form a modified long handled implement. The retrofitable auxiliary handle unit is pivotally mounted to the bottom end of the main shaft and can move in relation to the main shaft.

In this example the implement described is a lawn rake. In one of the push positions, the auxiliary handle unit is oblique to the main shaft. The auxiliary handle members are pivotally attached to the retrofitable securing means that is attached to the bottom end of the main shaft. The operator of the rake grips the main shaft with one hand and the auxiliary handle units gripping means with the opposite hand. The auxiliary handle unit is gripped by the hand grip provided and held at arm's length, to the side of the operator, with the auxiliary handle unit oblique to the main shaft. With a downward push on the auxiliary handle unit the force is transferred into a downward and horizontal direction via the angled connecting bar. This force pushes the rake engaging head transversely while the opposite hand is pulling on the main shaft in the same transverse direction. The auxiliary handle unit pivots away from the main shaft during the raking motion giving the operator greater horizontal pushing leverage. The result is a transverse pull\push at the rakes engaging head along the ground with the intended material being accumulated, and, both the operator's arms are working in the same direction. The operator then lifts upwardly on the auxiliary handle unit's hand grip, which lifts the rake engaging head, then pushes the main shaft with the opposite hand that swings the rake transversely to an extended position. The rake head is lowered to the ground and the steps to accumulate the desired material are repeated. This same motion lift\drop and pull\push apply to implements like garden rakes, hoes and the like.

Another pushing motion on the auxiliary handle is while using a shovel, pitchfork or broom type tool where the forward pushing force would be along the main shaft in a parallel disposition to the shovel engaging head. The forward pushing force is applied to the shovel through both the main shaft and the auxiliary handle unit, enabling the shoveler to push the shovel to accumulate material on the shovel engaging head. After accumulating sufficient material on the shovel engaging head, the operator pivots the auxiliary handle unit away from the main shaft so that a lifting force can be applied to the auxiliary handle unit in order to pull the shovel engaging head upwardly so the accumulated material can be tossed from the shovel engaging head.

In another example of the two handle implement of the present invention a pulling of the engaging head toward the operator and a pushing away of the engaging head from the operator motion, while the implements engaging head engages the ground or floor in both directions would be an implement such as a mop, garden rake, a long handled paint roller, or the like. In this example the implement described is a mop. In one of the push positions, the auxiliary handle unit is oblique to the main shaft. The auxiliary handle members are pivotally attached to the retrofitable securing means that is attached to the bottom end of the main shaft. The operator of the mop, while standing in an upright position, grips the main shaft with one hand and the auxiliary handles gripping means with the opposite hand. The auxiliary handle is gripped by the hand grip provided and held at arm's length, to the side of the operator, with the auxiliary handle unit in an oblique relation to the main shaft. With a downward push on the auxiliary handles gripping means, the force is transferred into a downward and horizontal direction via the angled connecting bar. This force pushes the mop head transversely while the opposite hand is pulling on the main shaft in the same transverse direction. The auxiliary handle unit pivots away from the main shaft during the moping motion giving the operator greater horizontal pushing leverage. The result is a transverse pull\push at the mop's head along the floor. The operator then changes direction of the push\pull action; whereas, the main shaft is pushed and the auxiliary handle is pulled transversely which creates the moping motion.

Additionally, the auxiliary handle unit when used with a shovel or other type scooping means provides a means by which material can be transported from one location to another without the laden shovel having to be lifted off the ground (no-lift shovel); whereas, using a snow shovel for an example; a forward pushing force is applied to the shovel through both the main shaft and the auxiliary handle unit, enabling the operator to push the shovel to accumulate material on the shovel engaging head. After accumulating sufficient material on the shovel engaging head, the operator releases the main shaft which falls at an angle towards the ground, which pivots the auxiliary handle unit away from the main shaft so that a lifting force can be applied to the auxiliary handle unit, which lifts the main shaft off of the ground in a relatively low angled position to the ground, at which time the operator turns around, facing away from the shovel engaging head and pulls the laden shovel by the auxiliary handle to the disposal area. At the disposal area the operator lifts upwardly on the auxiliary handle, which pivots the main shaft upwardly, which the operator grips and continues the upward and forward motion until the angle of the shovel engaging head is great enough to spill the snow off of the shovel engaging head which is generally a vertical position.

As can be appreciated, when the main shaft is released by the operator after accumulating a desired amount of snow, in the aforementioned no-lift shovel description, the scraping edge is forced upwardly by pivoting on the backside of the shovel engaging head. The curved nature of shovel engaging heads form a cradle when the main shaft is roughly horizontal to the ground, and is capable of temporarily holding material. The auxiliary handle unit is pivotally secured to the lower portion of the main shaft, above the shovel engaging head, enabling the auxiliary handle unit that is in a roughly vertical position, to control the oblique pitch of the main shaft off of the ground. Normally, the weight of the material on the shovel engaging head is of sufficient weight so when the auxiliary handle is lifted upwardly the top of the main shaft pivots upward with the shovel engaging head still resting on the ground. The retrofitable securing means can be adjusted vertically along the main shaft to compensate for different shovel configurations and weight loads, to efficiently control the angle of the main shaft for no-lift transporting material from one place to another. The controlled angle of the main shafts top end (end of main shaft farthest from the engaging head) serves to keep the top of the main shaft from digging into the ground during the transporting of the ladened shovel, and, controls the pitch of the cradle in the shovel engaging head to maintain the maximum amount of material on the shovel engaging head so the accumulated material can be transported along the ground to the disposal site.

As can be appreciated, using a shovel generally involves removing a portion of material one scoop at a time. Using a spade engaging head the operator might push the engaging head into the ground using their foot to push down on the shovel engaging head. When the shovel engaging head is of a sufficient depth into the ground the operator forces the main shaft downward at an angle to pivot the shovel engaging head out of the ground. The downward angled push on the main shaft often requires the operator to bend over to achieve the breaking loose of the material onto the shovel engaging head. Likewise, if the operator is using a snow shovel in wet heavy snow it is not uncommon to push the main shaft to a near horizontal position to pivot the shovel engaging heads scraping edge upwardly to break away a portion of the heavy snow for disposal.

With the applicants present invention the operator stands erect to break a portion of material loose for disposal; the operator after accumulating sufficient material on the shovel engaging head, pushes the main shaft downwards at an angle, and releases the main shaft which falls toward the ground, pivoting the shovels engaging head scraping edge upwardly by pivoting on the back of the curved shovel engaging head. At this point the auxiliary handle would pivot on the retrofitable securing means with the operator holding the auxiliary handle unit roughly vertical to the ground and the main shaft. The main shaft is pivoted upwards by the operator lifting upwards on the auxiliary handle unit. The main shaft is regripped to lift and toss the material from the shovel engaging head. The aforementioned, breaking a portion of material loose for disposal, is further accomplished with the select adjustment of the extensible shaft members for adjusting the working length to different sized operators and different working conditions, and the select adjustment of the retrofitable securing means along the vertical length of the main shaft to efficiently control the angle of the main shaft.

BRIEF DESCRIPTION OF THE DRAWINGS

These and other objects, advantages, and novel feature of the invention will become apparent from the detailed description of the best mode for carrying out the preferred embodiment of this invention which follows, particularly when considered in conjunction with the accompanying drawings; wherein.

BEST MODE FOR CARRYING OUT THE INVENTION

Figure 1:
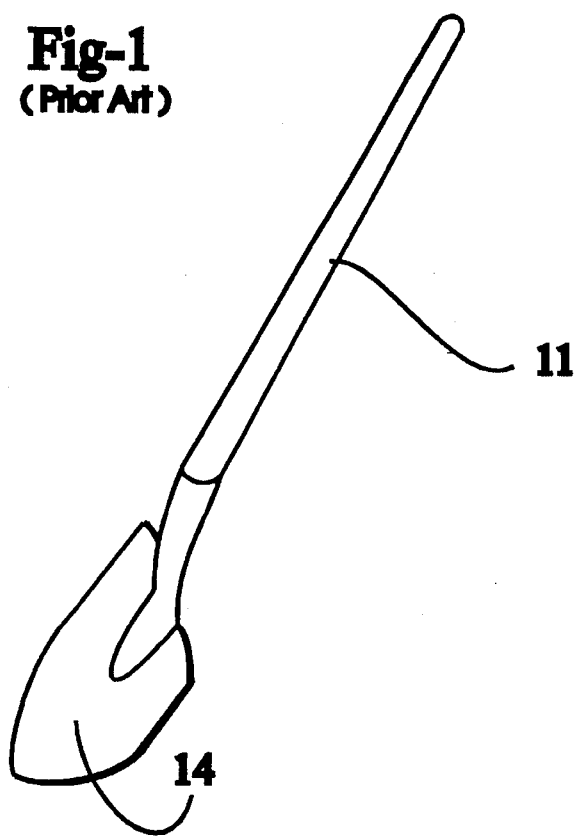
FIG. 1. Is a prospective view illustrating a prior art long handled implement with a shovel engaging head.

As can be seen by reference to the drawings and in particular to FIG. 1, a prior art long handled implement comprising a main shaft (11) that has a longitudinal axis, and a shovel engaging head (14) securely attached thereto.

Figure 2:
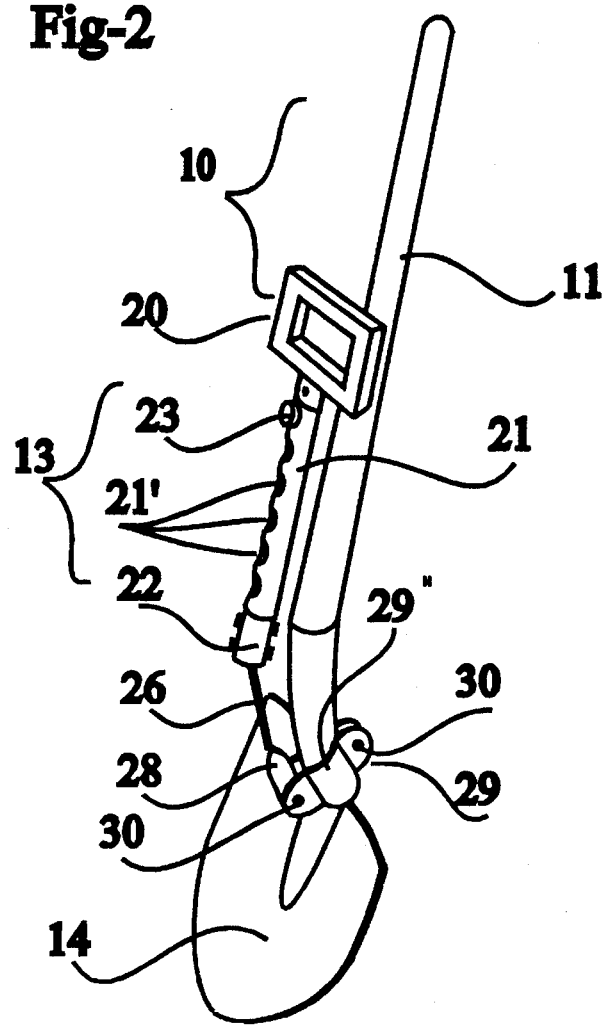
FIG. 2. Is a perspective view of the present invention illustrating a prior art long handled implement with a shovel engaging head, with the auxiliary handle unit pivotally connected to the bottom of the main shaft. The auxiliary handle unit is in a parallel position to the main shaft in a push position.

With reference to FIG. 2, a long handled implement (10) of the present invention is illustrated as a modification of the prior art shovel FIG. 1. The auxiliary handle unit that comprises the bases of the present invention is designated generally by the reference number (13). The auxiliary handle unit (13) comprises in general; an extensible shaft unit (21 and 22); with a gripping means (20) attached to the top end (21); and, an angled connecting bar (26) securely attached to the bottom end (22). The connecting bar (26) is operatively connected to the retrofitable securing means (29) which is connected to the main shaft (11) at the lowest feasible point, above the shovel engaging head (14). The auxiliary handle unit (13) is parallel to the main shaft (11) in the push down or forward position.

Figure 3:
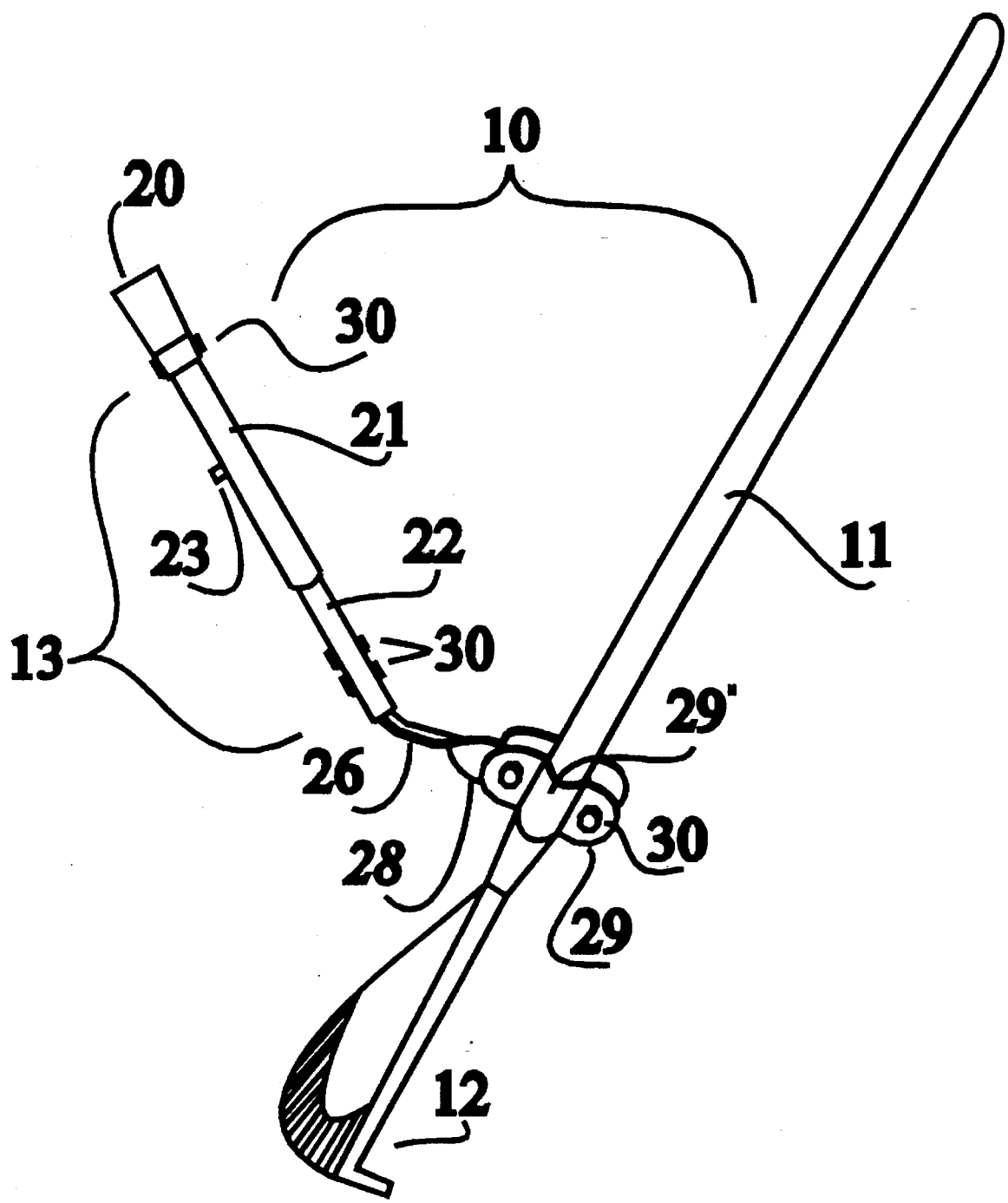
FIG. 3. Is a perspective view of the present invention of the auxiliary handle unit attached to a long handled implement with a lawn rake engaging head, with the auxiliary handle unit pivotally connected to the main shaft, and with the auxiliary handle unit in an oblique (working) position to the main shaft.
Figure 4:
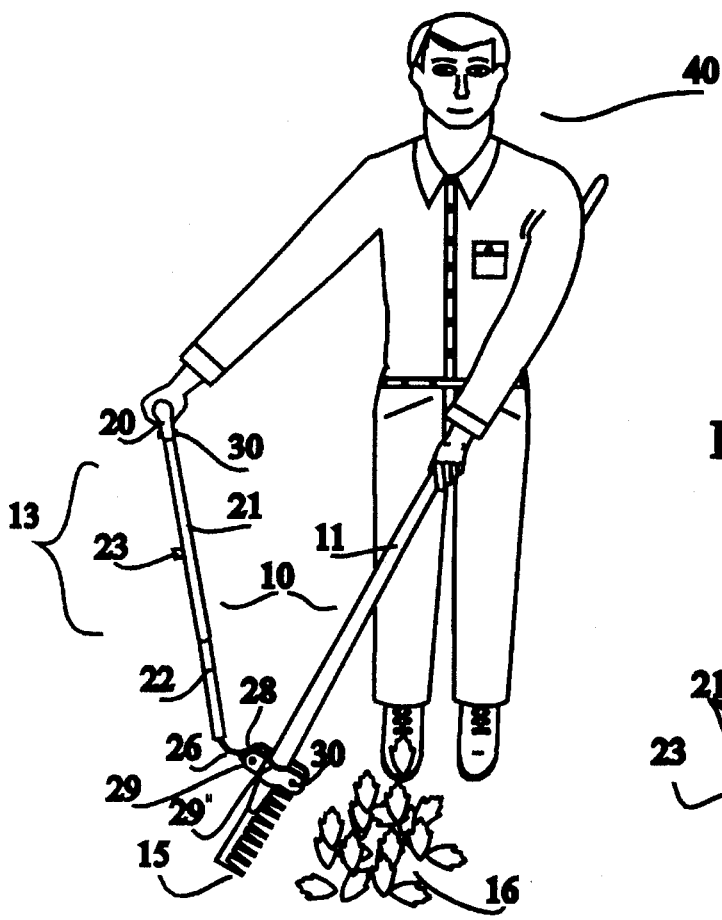
FIG. 4. Is an illustration of the two handled garden rake of the present invention with an operator in the ready position using the modified rake transversely to accumulate material.

As can be seen in FIG. 3, The auxiliary handle unit (13) that comprises the basis of the present invention is in a relative position to the main shaft (11) for transversely using long handled implements (FIG. 3. and FIG. 4). The auxiliary handle unit (13) is pivotally attached to the main shaft (11) by way of an angled connecting bar (26) and a retrofitable securing means (29); wherein, one end (27) of the angled connecting bar (26) is firmly wedged into the lower shaft member (22) and secured in place with a nut and bolt assembly (30); whereas, the opposite end of the angled connecting bar (26) has a 90 degree twist (28) and is fitted with an aperture (26"), that is pivotally connected between the two halves of the retrofitable securing means (29); wherein, the appropriate number of spacers (FIG. 9. No. 31) are fitted to each side of the lower end (28) of the angled connecting bar (26), and between the two halves of the retrofitable securing means (29), and held in place by a nut and bolt assembly (30).

The use of the principals of the present invention is illustrated in FIG. 4. in terms of the use of the auxiliary handle unit (13) being used with a long handled (11) rake engaging head (15). The operator grips both the auxiliary handle (20) and the main shaft (11) in the ready position (FIG. 3. and FIG. 4.); Wherein, the operators (40) hand gripping the auxiliary handle units (13) gripping means (20) is extended to the side of the body, and the hand gripping the main shaft (11) is crossed in front of the operator's (40) body. The operator (40) then begins pulling on the main shaft (11) with one hand, and simultaneously pushes down and towards the rake engaging head (15) with the opposite hand. The pushing down motion on the auxiliary handle unit (13) is transferred to a down and horizontal direction by way of the angled connecting bar (26) which assists the rake engaging head (15) to pass transversely to the operator (40) accumulating the desired material (16). For returning the rake engaging head (15) to the starting position, the auxiliary handle (13) is lifted upwardly and swung transversely, back to the original starting position (FIG. 4.) with the opposite hand following. The engaging head is set down by lowering the auxiliary handle unit (13) and the motions are ready to be repeated.

As can be appreciated the aforementioned description for accumulating material can be modified to work with other long handled implements requiring a downward, forward push and backwards pull motion, a mopping or paint roller type motion. The ready position as shown in FIG. 4 is the same position as an operator (40) would use with a long handled (11) mop (not shown). The operator would pull the main shaft (11) with one hand and simultaneously push down and towards the engaging head with the auxiliary handle unit (13) until the operator (40) has reached the extension of their arms, at which time the operator would reverse the procedure and pull the auxiliary handle unit (13) while pushing forwards and downwards on the main shaft (11). This procedure keeps the engaging head in contact with the floor in both directions.

Figure 5:
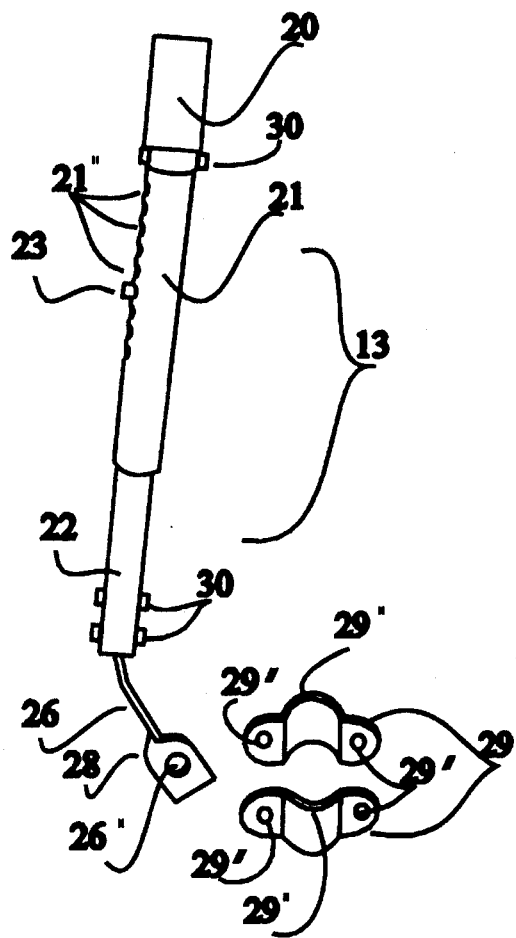
FIG. 5. Is a side perspective view of the extensible shaft unit with gripping means secured to one end and an angled connecting bar secured to the other end, also, the retrofitable securing means halves.

In the preferred embodiment of the present invention, FIG. 5 shows a side view of the auxiliary handle unit (13). As can be seen the "D" hand grip (20) is securely fastened to the top portions aperture (21') of the upper shaft member (21) by a nut and bolt assembly (30). The extensible shaft members (21, and 22) comprises: locking extensible shaft members (21 and 22); wherein, the upper portion (21) is extensible with the lower portion (22), and a locking means (23) are provided to temporarily secure the upper (21) and lower (22) shaft members at a desired location relative to one another, by way of apertures (21") spaced along the vertical extension of the upper shaft member (21). The angled connecting bar (26) is wedged into the lower shaft member (22) and securely fastened by a nut and bolt assembly (30) on one end; whereas, the opposite end of the angled connecting bar (26) is turned 90 degrees (28) and fitted with an aperture (26") which aligns with the apertures (29') on the two halves of the retrofitable securing means (29) and pivotally secured by a nut and bolt assembly (30)

Figure 6:
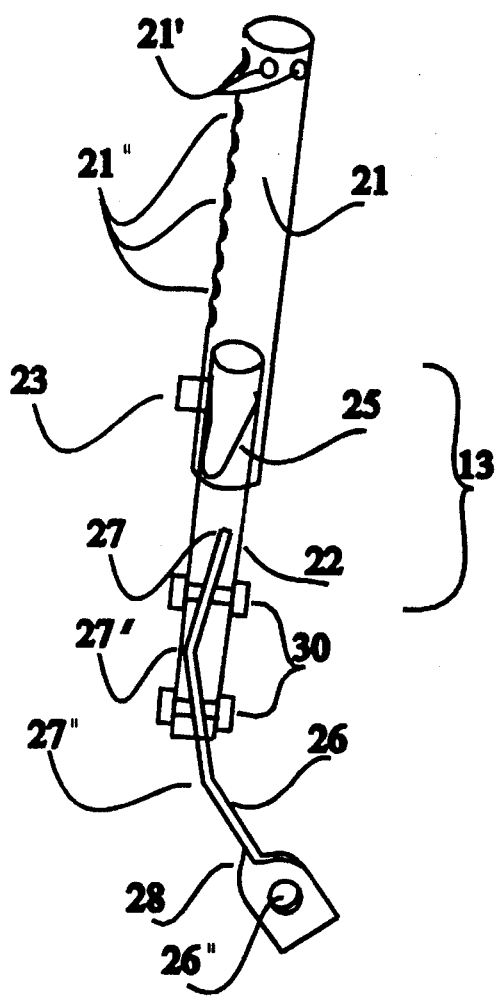
FIG. 6. Is a perspective view illustrating see-through extensible shaft members to show the placement of the stop button and the wedged disposition of the angled connecting bar.

As can be seen in particular by reference to FIG. 6. the see-through extensible shaft members (21 and 22) show the relative positions of the stop button (23) and spring assembly (25), along with the bent nature of the angled connecting bar (26) wedged and secured to the lower shaft member (22) by a nut and bolt assembly (30).

Figure 7A:
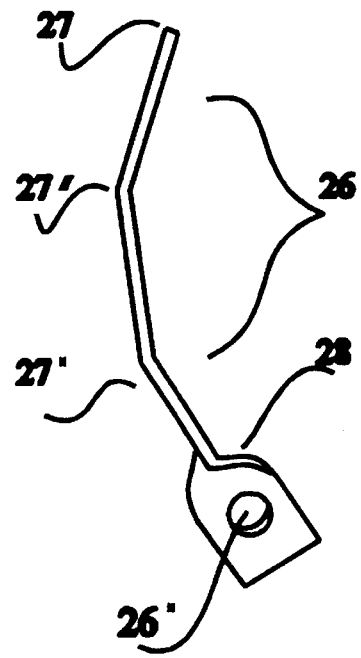
FIG. 7A. Is a perspective side view of the angled connecting bar.
Figure 7B:
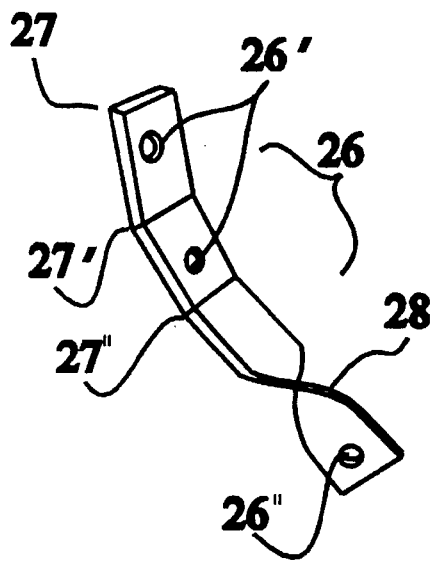
FIG. 7B. Is a perspective angled view of the angled connecting bar.

As can be seen in the side view of FIG. 7A the bent disposition of the metal or plastic angled connecting bar (26)

has multifunctions with the first being to securely wedge the angled connecting bar (26) into the lower shaft member (22) to eliminate any movement (Free play) between the lower shaft member (22) and the angled connecting bar (26); wherein, the angled connecting bar (26) is dimensioned to engage the inside diameter of the lower shaft member (22) at three points in the wedged position. As illustrated in FIG. 6. the angled connecting bar (26) engages the inside of the lower shaft member (22) at points (27), (27') and roughly midway between point (27') and (27"); wherein, the height of point (27') in relation to a straight line from point (27) to (27") is greater than the inside diameter of the lower shaft member (22) causing the angled connecting bar (26) to wedge securely in place; in addition, the angled connecting bar (26) is mechanically secured to the lower shaft member (22) with nut and bolt assembles (30). The lower portion (28) of the angled connecting bar (26) is turned 90 degrees to the angled connecting bar's (26) horizontal plane which allows the angled connecting bars (26) lower turned portion (28) to fit vertically between the two halves of the retrofitable securing means (29), and is pivotally connected by a nut and bolt assembly (30) through the apertures (29') in the retrofitable securing means (29) and as best seen in FIG. 7B, the aperture (26") in the angled connecting bar (26). As can best be seen in FIG. 5. the angled connecting bar (26) exits the lower shaft member (22) obliquely.

Figure 8:
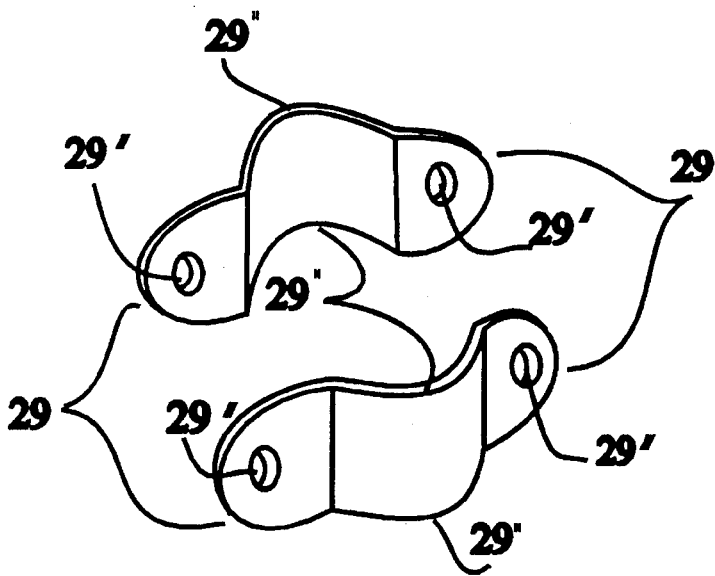
FIG. 8. is a perspective view of the retrofitable securing means.

As can be seen in FIG. 8 the retrofitable securing means (29) are made from a sturdy metal bar or other suitable material (plastic, fiberglass, etc.) and each half is interchangeable with the other. The metal bar's (29) plane is interrupted in the center, concavely (29"), with apertures (29') formed at each end. The concave section (29") is dimensioned to provide a pocket to frictionally hold the auxiliary handle unit (13) to the main shaft (FIG. 1, No. 11) of long handled implements (FIG. 2, FIG. 3, FIG. 4.). The concave section (29") of the retrofitable securing means (29) is retrofitable to different diameter main shafts (11) as illustrated in (FIG. 2, FIG. 3, and FIG. 4.). The retrofitable securing means halves (29) are positioned on the sides of the main shaft (11) which is generally traverse with the engaging head (FIG. 3, No. 12) horizontal plane. The main shaft (11) is fitted in the concave section (29") of one half of the retrofitable Securing means (29) and the second half of the retrofitable securing means (29) is positioned opposite, with the apertures (29') aligning with both halves; wherein, the lower turned end (28) of the connecting bar (26) is positioned with the alignment of aperture (26") with apertures (29') of the retrofitable securing means (29); wherein, a nut and bolt assembly is positioned through apertures (29') and (26"); wherein, the two halves of the retrofitable securing means (29) are pulled together by tightening the nut and bolt assemblies (30), frictionally holding the auxiliary handle unit (13) to the main shaft (11). Additionally, the retrofitable securing means (29) is axially rotatable on the main shaft (11) via the loosening and tightening of the nut and bolt assemblies (30) on the retrofitable securing means (29), which provides adjustability to suit the operators (40) needs (right or left handed operation and\or operational requirements).

Figure 9:
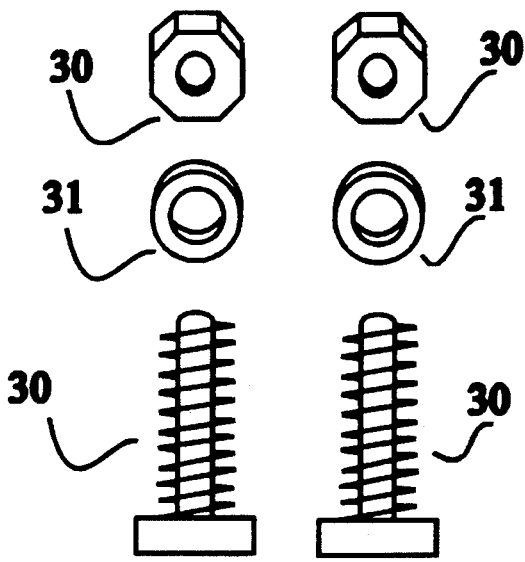
FIG. 9. Is a perspective view of a nut, bolt and spacer assembly.

As shown in FIG. 9 the nut and bolt assembly (30), is a typical securing means. The diameter and length of the nut and bolt assemblies (30) are proportional to the diameter and needs of securing strength; whereas, the nut and bolt assembly (30) that secure the two halves of the retrofitable securing means (29) together are extended which allows for adjustability to different diameter main shafts (11); whereas, the auxiliary handle unit (13) is retrofitable to main shafts (11) such as a small diameter grass rakes main shaft FIG. 3 No. 12. to larger diameter main shafts (11) such as shovels FIG. 2. No. 11. The spacer washer (31) associated with the nut and bolt assembly (30) are used as spacers when used in conjunction with the connecting bar (26), specifically aperture (26"), whereas, the spacers (31) and aperture (26") are positioned and aligned with apertures (29') on the retrofitable securing means (29); whereas, a bolt is fitted through the apertures (29'), (31), and (26") with the nut (30) secured to the end of the bolt (30). The spacers (31) with equal numbers on each side, keep the connecting bar (26) centered between the retrofitable securing means halves (29), and, keeps the retrofitable securing means halves (29) roughly in a parallel position to each other; and, provide frictional resisance to eliminate any freeplay between the retrofitable securing means (29) and the angled connecting bar (26).

Figure 10A:
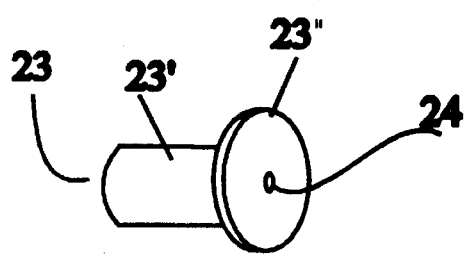
FIG. 10A. Is a perspective angled view of a typical stop button.
Figure 10B:
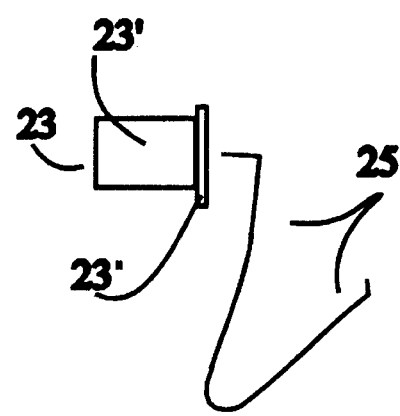
FIG. 10B. Is a perspective side view of a typical stop button and spring assembly.

As can be seen in FIG. 10A and FIG. 10B the typical metal stop button (23) has an extended shaft (23') with an enlarged end (23"), for temporarily securing the extensible shaft members (21) and (22) together. The stop button (23) is fitted with an aperture (24) in the center of the enlarged end (23") to receive a typical tension spring (25) which holds the stop button (23) in the out position. The stop button (23) and spring (25) are inserted into the lower shaft member (22) with the elongated section (23') extending through aperture (22'). The upper shaft member (21) is positioned over the lower shaft member (22), with the stop button (23) depressed, the upper shaft member (21) drops down until an aperture (21") lines up with the stop buttons elongated shaft (23') at which time the elongated shaft (23') is forced through the aperture (21") by the tension spring (25) securely holding the upper shaft member (21) with the lower shaft member (22) in a secure selective position.

Figure 11:
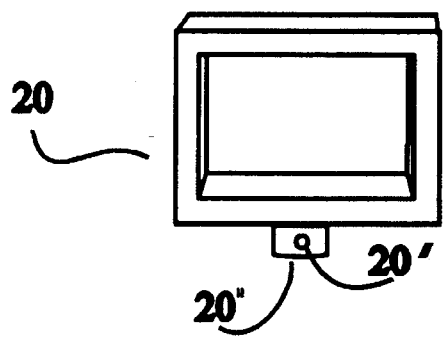
FIG. 11. Is a front perspective view of a typical "D" grip handle.

As can be seen in FIG. 11 the "D" hand grip (20) is a typical plastic hand gripping means. The "D" hand grip is fitted with a gripping means (20), an aperture (20") to fit the "D" hand grip (20) to the top of the upper shaft member (21) and secured in place by a nut and bolt assembly (30) through aperture (20') on the "D" hand grip (20) and apertures (21') on the upper shaft member (21). The "D" hand grip (20) is axially adjustable on the upper shaft member (21) via the apertures (21') around the top periphery of the upper shaft member (21).

Figure 12:
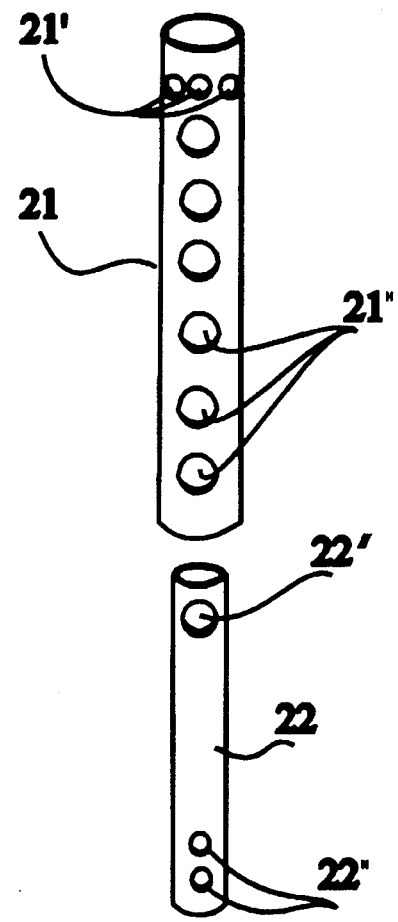
FIG. 12. Is a perspective view of the upper and lower extensible shaft members.

As illustrated in FIG. 12 the extensible shaft unit (21) and (22) consists of two metal or plastic hollow shaft members, the upper shaft member (21) and the lower shaft member (22) that are dimensioned to be reciprocal with each other. The apertures (22") on the lower shaft member (22) are dimensioned to receive nut and bolt assembles (30) to secure the angled connecting bar (26) to the lower shaft member (22). The aperture (22') at the top of the lower shaft member (22), is dimensioned to receive the elongated shaft (23') of the stop button (23). The spaced apertures (21") along the vertical axis in the upper shaft member (21) are dimensioned to receive the elongated shaft (23') of the stop button (23). The apertures (21') around the periphery of the upper shaft member (21) are dimensioned to receive a nut and bolt assembly (30) which secures the "D" hand grip (20) to the top of the upper shaft member (21) in selective positions.

As can be appreciated, the aforementioned embodiment of the present invention (13) can also be used as a no-lift material transport device on shovel type scooping means (snow shovels, square end shovels, grain shovels, and the like). Using a shovel engaging head (FIG. 2 No. 14) as an example, the forward pushing force would be along the main shaft (11) in a parallel disposition to the shovel engaging head (14); wherein, the forward pushing force is applied to the shovel through both the main shaft (11) and the auxiliary handle unit (13), enabling the operator (40) to push the implement to accumulate material (FIG. 4 No. 16) on the shovel engaging head (14). After accumulation of sufficient material (16) on the shovel engaging head (14), the operator (40) releases the main shaft (11) which falls downwards, which pivots the auxiliary handle unit (13) away from the main shaft (11) vertical to the ground and main shaft (11) so that a lifting force can be applied to the auxiliary handle unit (13) in order to pull the main shaft (11) upwardly so the accumulated material (16) can be transported to the disposal site; whereas, the operator (40) allows the main shaft (11) to drop downwards while still holding the auxiliary handle (13), turns 180 degrees faceing away from the shovel engaging head (14), lifts the "D" hand grip (20) upwards to lift the main shaft (11) a small angle off of the ground; wherein, the backside of the shovel engaging head (14) is dragged across the ground to the disposal area; wherein, the auxiliary handle unit (13) is pulled upwards which pivots the main shaft from a roughly horizontal position to a vertical position; wherein, the vertical disposition of the main shaft (11) encourages the transported material (16) to slide off of the shovel engaging head (14); wherein, the auxiliary handle unit (13) is adjustable along the length of the main shaft (11) by way of loosening and tightening the nut and bolt assembly (30) on the retrofitable securing means (29) to precisely place the auxiliary handle unit (13) on the main shaft (11) to control the angle of the main shaft (11); whereas, if the weight of the material (16) on the shovel engaging head (14) is a lightweight material (16), and the shovel engageing head (14) is lifted when the auxiliary handle unit (13) is lifted to angle the main shaft (11) off of the ground, the retrofitable securing means (29) would be adjusted upwards towards the top end of the main shaft (11) for improved control of the main shaft (11) during the transporting and dumping of material (16).

Having thereby described the subject matter of this invention, it should be apparent that many substitutions, modifications, and variations of the invention are possible in light of the above teachings. It is therefore to be understood that the invention as taught and described herein is only to be limited to the extent of the breath and scope of the claims.

I claim:

1. An improvement in an auxiliary handle unit for long handled tools having an elongated primary handle with upper and lower ends and an engaging head at the lower end thereof wherein the auxiliary handle unit consists of, an extensible shaft unit, a hand grip dimensioned to receive one end of the extensible shaft unit, an angled connecting bar unit connected to the opposite end of the extensible shaft unit, said angled connecting bar unit pivotally secured to a retrofitable securing means, said retrofitable securing means attached to a main shaft of the long handled tool, wherein said extensible shaft unit comprises elongated upper and lower shaft members each having respective upper and lower ends, the upper and lower shaft members being adjustably reciprocal with each other and secured together with a stop button, and one end of the upper shaft member is fitted with a first and second set of apertures whereby the first set of apertures are formed around an end periphery of the upper shaft member to selectively secure said hand grip thereto by a first nut and bolt assembly for various hand positions, and the second set of apertures are spaced along the longitudinal axis of the upper shaft member, the upper shaft member's opposite end being dimensioned to fit over a first end of the lower shaft member such that the first end of the lower shaft member receives said upper shaft member reciprocally, and said lower shaft member is fitted with a first set of apertures and a second aperture, wherein the second aperture is located near the first end of the lower shaft member and is dimensioned to receive said stop button, and the first set of apertures are located near a second end of the lower shaft member for securing said angled connecting bar unit thereto, wherein one end of said angled connecting bar unit is wedged into the second end of the lower shaft member and is secured thereto by a second nut and bolt assembly extending through the first set of apertures in the lower shaft member, said angled connecting bar unit is comprised of an elongated bar having an upper end with an aperture, a middle section with an aperture, and a lower end with an aperture, wherein the upper end of the angled connecting bar unit is angled obliquely with respect to the middle section in order to provide securement within said lower shaft member's second end, and the lower end of the angled connecting bar unit is also angled obliquely with respect to the middle section and contains a distal end portion that is twisted with respect to the remaining portion of the lower end, said distal end portion having an aperture to pivotally connect between the retrofitable securing means, wherein said retrofitable securing means comprises a pair of metal bars each having apertured front and back ends with a concave center portion therebetween, said concave center portion of said retrofitable securing means being frictionally attachable to the circumference of the primary handle and securable thereto by a third nut and bolt assembly extending through an aperture of either the front or back walls of the metal bars of said retrofitable securing means thereby pivotally securing said angled connecting bar unit thereto, wherein an equal number of washers and spacers are disposed on each side of said angled connecting bar unit to align the lower end of said angled connecting bar unit between the pair of metal bars of said retrofitable securing means in order to secure said auxiliary handle unit to the primary handle.

* * * * *